3,047,633
ETHERS OF DICHLOROCYCLOPROPANE

Herman A. Bruson, North Haven, and Thomas P. O'Day, Hamden, Conn., assignors to Olin Mathieson Chemical Corporation, New Haven, Conn., a corporation of Virginia
No Drawing. Original application July 1, 1957, Ser. No. 668,850, now Patent No. 3,012,079, dated Dec. 5, 1961. Divided and this application June 17, 1960, Ser. No. 40,990
4 Claims. (Cl. 260—611)

This invention relates to novel chemical compounds, particularly substituted dichlorocyclopropanes which may be formed by the addition of dichlorocarbene to certain olefinic compounds.

This application is a division of our pending application Serial No. 668,850, filed July 1, 1957, now Patent No. 3,012,079.

Among the objects of the invention are the provision of certain novel substituted dichlorocyclopropanes having advantageous properties for various uses in the arts. A further object is the provision of novel chemical compounds displaying biological activity. Another object is the provision of novel substituted dichlorocyclopropane compounds adapted to serve as effective fungicidal agents.

The foregoing objects have been accomplished by the synthesis and testing of the following compounds:

| No. | Structural Formula | Name |
|---|---|---|
| I | [phenyl-CH—CH$_2$ bridged to CCl$_2$] | (Adduct of dichlorocarbene to styrene.) |
| II | [dichlorophenyl-CH—CH$_2$ bridged to CCl$_2$] | (Adduct of dichlorocarbene to dichlorostyrene.) |
| III | [dicyclopentadiene fused with CCl$_2$-CH$_2$] | (Adduct of dichlorocarbene to dicyclopentadiene.) |
| IV | [2,3-dichlorodihydrodicyclopentadiene fused with CCl$_2$-CH$_2$] | (Adduct of dichlorocarbene to 2,3-dichlorodihydrodicyclopentadiene.) |
| V | [CH$_2$—CHCH$_2$O—dihydrodicyclopentadienyl, CCl$_2$ ring] | (Adduct of dichlorocarbene to allyl ether of 5-hydroxydihydrodicyclopentadiene.) |
| VI | [CH$_2$—CHOC$_2$H$_5$ with CCl$_2$] | (Adduct of dichlorocarbene to vinyl ethyl ether.) |

The syntheses of these compounds and tests thereof are illustrated in the following non-limitative specific examples.

EXAMPLE I.—COMPOUND I

In a 1 liter 3-necked reaction flask equipped with stirrer and condenser, 300 g. of tertiary-butylalcohol was heated to reflux temperature, and 23 g. (1.0 mole) of sodium was slowly added in small portions. After the mixture had refluxed for 16 hours all the sodium had dissolved, and the excess alcohol was removed by distillation under reduced pressure. Sodium tertiary-butoxide remained in the flask as a white powder, and 208 g. (2.0 mole) of styrene were added. After stirring to form a slurry, 131.3 g. of 1.1 mole) of chloroform was added to the mixture over a two hour period at a temperature of 30°–50° C. It was necessary during this addition to add 225 cc. of toluene to the reaction flask to facilitate stirring as the reaction mixture became very viscous. After the addition was completed, the mixture was stirred for thirty minutes at 40°–50° C. and poured into cold water. The organic layer was washed several times with a saturated sodium chloride solution, dried with anhydrous sodium sulfate, and filtered, yielding a clear red solution. The filtrate was distilled in a nitrogen atmosphere, yielding 84 g. of colorless liquid distillate, boiling at 56° C./.4 mm. This sample represented a 47% yield of desired adduct. *Analysis.*—Calculated for $C_9H_8Cl_2$: C, 57.75%; H, 4.28%; Cl, 37.97%. Found: C, 57.87%; H, 4.43%; Cl, 37.50%.

EXAMPLE II.—COMPOUND II (a) In a 1 liter 3-necked reaction flask equipped with stirrer and condenser, 400 g. of tertiary-butylalcohol was heated to reflux temperature, and 23 g. (1.0 mole) of sodium was added in small portions to the flask. After 24 hours of stirring under reflux, all the sodium had dissolved and the excess alcohol was removed in vacuo. Sodium tertiary-butoxide remained in the flask as a white powder. The powder was covered with 346 g. (2.0 mole) of freshly distilled dichlorostyrene, and 225 cc. of toluene. To this mixture there was added with stirring 131.3 g. (1.1 mole) of chloroform. Addition was completed in 1½ hours at a temperature range of 35°–45° C. The reaction mixture was stirred for 1 hour longer at 40°–50° C. and was then poured into water. The organic layer was washed with hot sodium chloride solution, dried with anhydrous sodium sulfate and filtered. The filtrate was distilled in a nitrogen atmosphere using a short Vigreux column. A pale yellow liquid distillate was obtained; 36.6 g., B.P. 83°–85° C./.1 mm. This sample represented a 15% yield of desired adduct. *Analysis.*—Calculated for $C_9H_6Cl_4$: Cl, 55.5%. Found Cl, 54.8%.

(b) In a 250 cc. 3-necked flask equipped with stirrer, thermometer, condenser, and gas bubbler was placed 45 g. (.24 mole) of adduct, prepared as in Example I, 75 cc. of CCl$_4$ and 1 g. of finely powdered iron. Chlorine was then slowly bubbled into the reaction flask. A mild evolution of heat was observed, and the reaction temperature was maintained at 20°–30° C. by occasional cooling as required. Chlorine addition was contined until no further heat evolution was noted. The organic layer was washed with water, dried, and distilled. It was necessary to use a very short column as the material was difficult to distill. There was obtained 62.8 g. of a viscous yellow liquid, B.P. 148°–165° C./.8 mm., $n_D^{25} = 1.6040$. *Analysis.*—Calculated for $C_9H_6Cl_4$: Cl, 55.5%. Found: Cl, 56.2%.

EXAMPLE III.—COMPOUND III

A 3-necked 1-liter reaction flask was equipped with a stirrer, a nitrogen inlet tube and a condenser fitted with a drying tube. Freshly distilled dry tertiary-butylalcohol (550 cc.) was placed in the flask and heated to reflux temperature. Over a four hour period, small pieces of solid potassium, 26.7 g. (.686 mole) were slowly added. A clear solution was obtained at the end of this period. Excess alcohol was then removed by vacuum distillation. The residual white solid (126 g.) was placed in a 1-liter three necked flask equipped with stirrer, thermometer and dropping funnel. A solution of 181 g. (1.37 moles) of dicyclopentadiene in 200 cc. of petroleum ether was poured over the solid and the stirred mixture was cooled to 5° C. Then 81.8 g. (.685 mole) of chloroform was added dropwise over a two hour period at 5°–15° C. The mixture was then stirred for ½ hour at this temperature and then allowed to warm to room temperature. The mixture was poured into water, and the layers were separated, with the addition of petroleum ether. The organic layer was washed with water, dried and distilled. There was obtained 64.4 g. of a yellow liquid distillate, B.P. 86–88° C./1 mm., $n_D^{25}=1.5380$. This cut represented a yield of 44%. *Analysis.*—Calculated for $C_{11}H_{12}Cl_2$: Cl, 33.0%. Found: Cl, 31.6%.

EXAMPLE IV.—COMPOUND IV

In a 250 cc. 3-necked flask equipped with stirrer and thermometer was placed 43 g. (.20 mole) of the adduct obtained in Example III and 100 cc. of $CCl_4$. The solution was cooled to 0° C. and chlorine was passed slowly into the reaction flask. The resulting reaction was exothermic, but the reaction temperature was maintained at 0–10° C. by using an ice bath. This addition was continued until no further weight increase was noted. The solution was poured into water, and after washing with sodium bisulfite solution and water, the organic layer was dried, filtered and distilled. It was necessary to use a very short column as the material was a high boiling viscous product. There was obtained as distillate 38.4 g. of viscous green oil, B.P. 145°–160° C./.8 mm., $n_D^{25}=1.5628$. This fraction represented a yield of 65% of chlorinated material. *Analysis.*—Calculated for $C_{11}H_{12}Cl_4$: Cl, 49.65%. Found: Cl, 47.93%.

EXAMPLE V.—COMPOUND V

In a 500 cc. 3-necked flask equipped with stirrer, condenser, thermometer and dropping funnel was placed 232 g. (4.0 moles) of allyl alcohol and 147 g. (1.1 moles) of dicyclopentadiene. Then 26.5 g. (.187 mole) of boron trifluoride etherate was added dropwise over a one hour period. The flask temperature during this addition rose to 33° C. The solution was stirred at room temperature for one hour. The solution was then heated to 98° C., and the solution was refluxed at this temperature for four hours.

After several washings with weak base and with water, the solution was distilled in a nitrogen atmosphere in vacuo. There was obtained as distillate 179 g. of colorless liquid, B.P. 70°–73° C./.4 mm., $n_D^{25}=1.4998$. (Bruson and Riener, Journal American Society, volume 68, page 8, 1946, $n_D^{25}=1.500$.) This fraction represented an 85.5% yield of desired product, allyl ether of hydroxydihydrodicyclopentadiene.

Four-tenths of a mole of the powdered potassium tertiary butoxide obtained as described in Example III was placed in a 1-liter 3-necked flask equipped with stirrer, thermometer and dropping funnel. Then, 152 g. (.80 mole) of the above allyl ether and 350 cc. of petroleum ether were poured over the solid. The mixture was cooled to 5° C., and 48 g. (.40 mole) of chloroform was added over a 45 minute period at a temperature range of 5°–15° C. The temperature was allowed to rise to room temperature and the mixture was poured into water. The organic layer was separated, washed, dried and distilled. There was obtained 35.7 g. of colorless liquid distillate, B.P. 122°–125° C./.8 mm., $n_D^{25}=1.5233$. This fraction represented a 33% yield of the desired adduct. *Analysis.*—Calculated for $C_{14}H_{18}OCl_2$: C, 61.54%; H, 6.59%, Cl, 26.01%. Found: C, 61.03%; H, 6.54%; Cl, 24.89%.

EXAMPLE VI.—COMPOUND VI

One mole of the powdered potassium tertiary butoxide obtained as described in Example III was placed in a 1-liter 3-necked flask equipped with stirrer, thermometer and dropping funnel. A solution of 144 g. (2.0 moles) of vinyl ethyl ether and 400 cc. of petroleum ether was poured over the butoxide and the stirred mixture was cooled to 8° C. Chloroform, 119.4 g. (1.0 mole), was slowly added over a one hour period at a temperature range of 8°–15° C. After addition was completed, the mixture was allowed to warm up to room temperature and was poured into water. The organic layer was separated, washed, dried and distilled. There was obtained 59 g. of colorless liquid distillate, B.P. 74°–76° C./87 mm., $n_D^{25}=1.4421$. This fraction represented a 38% yield of the desired adduct, having the above formula.

The invention likewise comprehends compounds having similar properties related to II above, particularly the mono-, tri-, and tetrachlorophenyl-2,2-dichlorocyclopropanes, which may be prepared by procedures similar to those of Examples II(a) and II(b). Adducts related to VI and displaying similar properties may be prepared in accordance with the general procedure of Example VI using instead of vinyl ethyl ether other vinyl lower alkyl ethers, lower alkyl signifying a methyl, propyl, isopropyl, butyl, isobutyl, amyl, or isoamyl group.

The novel dichlorocarbene adducts, which may be termed substituted dichlorocyclopropanes, have been found to display useful biological activity particularly by fungicidal tests.

Tests as soil fungicides were carried out by placing discs 5 mm. in diameter of an agar culture of the economically important pathogen *Pythium ultimum* on Petri dish plates of potato dextrose agar containing 250 parts per million or other known concentration of the chemical being tested. The plates were then incubated for a sufficient length of time to give satisfactory growth of the fungi on control plates containing no chemical. Percent inhibition of the pathogen by each chemical was calculated from the measured diameters of fungal growths in the presence and absence of chemical.

The following results were obtained with adducts prepared as above, at a concentration of 250 parts per million, in comparison with control samples (no chemical added), a commercial standard fungicide (chloranil) and a substituted dichlorocyclopropane of the prior art.

*Table I*

| Chemical: | Percent inhibition of *Pythium ultimum* |
|---|---|
| None | 0 |
| I | 100 |
| II(a) or (b) | 100 |
| III | 100 |
| IV | 100 |
| Dichlorocarbene-cyclohexene adduct [1] | 33 |
| Chloranil standard | 100 |

[1] Prepared as described by Doering and Hoffmann, Journal of the American Chemical Society, volume 76, page 6162 (1954).

It is further significant that at a chemical concentration of 25 parts per million, Compound II(a) or (b) displayed over 40% inhibition of *Pythium ultimum* as compared to 32% inhibition obtained with chloranil. Likewise, at a concentration of 25 parts per million, Compound II displayed 54% inhibition of *Rhizoctonia solani* and 48% inhibition of *Fusarium o. lycopersici* as compared with values of 33% obtained at this concentration against these pathogens with chloranil.

Foliage fungicide tests, as described in "Phytopathology," volume 33, pages 627–632 (1943) and volume 37, pages 354–356 (1947), showed that a concentration of somewhat less than 25 parts per million of Compound IV inhibited the germination of 50% of the spores of *Monolinia fructicola*, an organism which causes brown rot of stone fruits.

Herbicide tests, as described in "Weeds," volume 1, pages 352–365 (1952), showed selective toxicity toward weeds, at a dosage of 16 pounds per acre, of Compounds IV and VI on pre-emergence tests and of Compound V on post-emergence tests. The crops tested included wheat, corn, cotton and soybean and the weeds tested included pigweed, mustard, ryegrass and crabgrass.

Recorded values of percentage activity in the pre-emergence tests were 93% against weeds and 23% against crops for Compound IV and 45% against weeds and 23% against crops for Compound VI, as contrasted with the much less selective values of 100 and 82% respectively obtained for 2, 4 dichlorophenoxyacetic acid (2,4-D) at a dosage of 2 pounds per acre. In post-emergence tests, Compound V displayed 60% activity against weeds and 20% against crops as compared to values of 100 and 73% respectively for the above herbicide.

Fungicidal tests were also carried out for testing the inhibition of mildew in a standard zincless white house paint using method II described in "Industrial and Engineering Chemistry," volume 48, page 122 (1956). Films were prepared by applying two coats of paint on one side of No. 30 "Whatman" filter paper and air drying for at least two days. They were then placed in nutrient agar, containing 15 grams of agar, 30 grams of malt extract and 1,000 ml. distilled water and inoculated with *Pullularia pullulans* and stored for 3–4 weeks at 77° F. and 50% relative humidity. Table II lists the recorded observations.

Table II

| Mildewicide | Parts Per Million in Paint | Mildew Growth After 3 Weeks | Percent of Surface Area Covered by Mildew |
|---|---|---|---|
| Compound VI | 1,080 | very slight | about 10%. |
|  | [1] 3,070 | none | 0. |
| Compound V | 1,140 | very slight | about 10%. |
|  | 3,030 | none | 0. |
| Compound II | 1,050 | slight | about 20%. |
|  | 3,130 | ---do--- | Do. |
| Compound III | 1,023 | ---do--- | Do. |
| Compound IV | 1,100 | ---do--- | Do. |
|  | 3,090 | ---do--- | Do. |
| None | ---------- | considerable | about 60%. |

[1] After four weeks' test, the mildew growth amounted to about 30% of the sample area in contrast with complete covering of the control sample by mildew.

The foregoing tests therefore indicate the utility of the novel substituted dichlorocyclopropanes of this invention as biologically active agents, particularly, as displaying useful fungicidal and herbicidal properties.

We claim:

1. A substituted dichlorocyclopropane selected from the group consisting of:

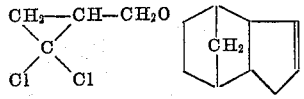

and

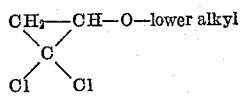

2. A substituted dichlorocyclopropane having the formula

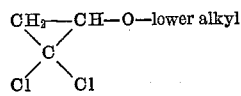

3. A substituted dichlorocyclopropane having the formula:

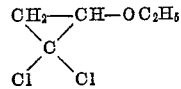

4. A substituted dichlorocyclopropane having the formula

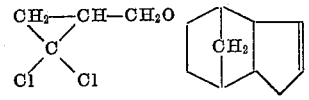

No references cited.